United States Patent
Yamamoto et al.

(10) Patent No.: US 10,442,085 B2
(45) Date of Patent: Oct. 15, 2019

(54) PRODUCTION SYSTEM FOR PERFORMING COOPERATIVE WORK BY OPERATOR AND ROBOT

(71) Applicant: FANUC CORPORATION, Yamanashi (JP)

(72) Inventors: Tomoyuki Yamamoto, Yamanashi (JP); Nao Ooshima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 205 days.

(21) Appl. No.: 15/709,601

(22) Filed: Sep. 20, 2017

(65) Prior Publication Data

US 2018/0093378 A1    Apr. 5, 2018

(30) Foreign Application Priority Data

Sep. 30, 2016 (JP) .................. 2016-194357

(51) Int. Cl.
| | |
|---|---|
| *G05B 19/04* | (2006.01) |
| *G05B 19/18* | (2006.01) |
| *B25J 9/16* | (2006.01) |
| *B25J 13/08* | (2006.01) |
| *B25J 19/06* | (2006.01) |

(52) U.S. Cl.
CPC .......... *B25J 9/1676* (2013.01); *B25J 13/085* (2013.01); *B25J 19/063* (2013.01); *G05B 2219/35473* (2013.01); *G05B 2219/40198* (2013.01); *G05B 2219/40201* (2013.01); *G05B 2219/40202* (2013.01); *G05B 2219/43203* (2013.01); *Y10S 901/46* (2013.01); *Y10S 901/49* (2013.01)

(58) Field of Classification Search
None
See application file for complete search history.

(56) References Cited

U.S. PATENT DOCUMENTS

| | | |
|---|---|---|
| 2016/0229068 A1 | 8/2016 | Haman et al. |
| 2016/0279797 A1 | 9/2016 | Zunke et al. |

FOREIGN PATENT DOCUMENTS

| | | |
|---|---|---|
| JP | S60-104695 A | 6/1985 |
| JP | 2004-181543 A | 7/2004 |
| JP | 2010-167523 A | 8/2010 |
| JP | 4648486 B2 | 3/2011 |
| JP | 2011-235423 A | 11/2011 |
| JP | 2012-51042 A | 3/2012 |
| JP | 2014-180725 A | 9/2014 |
| JP | 2015-208834 A | 11/2015 |
| JP | 5927284 B2 | 6/2016 |
| JP | 2016-137544 A | 8/2016 |

*Primary Examiner* — Bhavesh V Amin
(74) *Attorney, Agent, or Firm* — Hauptman Ham, LLP

(57) ABSTRACT

A production system includes a robot, a robot controller, and a person detection part. The controller includes first speed comparison unit that has the function of activating a power cutoff unit so as to stop an operation of the robot when a current speed exceeds a predetermined reference speed; and an external-force comparison unit that has the function of activating the power cutoff unit so as to stop the operation of the robot when a current force applied to the robot exceeds a predetermined reference force. The controller disables the functions of the first speed comparison unit and the external-force comparison unit while the person detection part detects the absence of the operator in the cooperative operation space.

5 Claims, 8 Drawing Sheets

PRODUCTION SYSTEM FOR PERFORMING COOPERATIVE WORK BY OPERATOR AND ROBOT

RELATED APPLICATIONS

The present application claims priority to Japanese Patent Application No. 2016-194357 filed Sep. 30, 2016, the disclosure of which is hereby incorporated by reference herein in its entirety.

BACKGROUND OF THE INVENTION

1. Field of the Invention

The present invention relates to a production system having a cooperative operation space where a robot and an operator enter at the same time in order to perform cooperative work.

2. Description of the Related Art

In production sites, there are a lot of requirements in which operator performs preparatory work so as to improve productivity in a movable range for a robot that is operated. In such a production site, an operator enters the movable range of the robot and supplies parts or takes out parts for the robot. In this case, the operator and the robot need to work in the same space. The operator in this state normally needs to stop the robot in order to ensure safety before the operator enters the movable range of the robot. However, if the robot is stopped each time the operator enters the movable range of the robot, the productivity may significantly decrease.

In a method proposed in Japanese Patent No. 4648486, when the operator enters a cooperative operation space that allows entry of the operator and a robot at the same time, the robot in the cooperative operation space is operated at a lower speed than that before the operator enters the cooperative operation space. This method can prevent a considerable reduction in the productivity of the robot even when the robot and the operator perform the cooperative work in the same space. However, even if the operation speed of the robot is reduced, the operator may be seriously injured unless the robot stops when the robot comes into contact with the operator.

Furthermore, in order to ensure the safety of an operator, Japanese Patent No. 5927284 proposes a robot system that has a contact stop function that stops a robot when detecting an external force generated by an operator that comes into contact with the robot.

The robot operating in cooperation with the operator in the same space needs to operate at a low speed so as not to apply an excessive contact force to the operator when the robot comes into contact with the operator. However, in order to improve the operation efficiency of the robot, the robot needs to be operated at a high speed. Thus, a method for a high-speed operation of a robot has been examined in order to minimize a reduction in the operation efficiency of the robot in the presence of an operator in a safe location that is away from the robot. Unfortunately, when the robot having the contact stop function is operated at a high speed according to Japanese Patent No. 5927284, a force generated by the robot may activate the contact stop function so as to stop the robot.

SUMMARY OF THE INVENTION

The present invention provides a production system that can improve the efficiency of cooperative work by a robot and an operator while ensuring the safety of the operator in a production site where the robot and the operator work in cooperation in the same space.

According to an aspect of the present disclosure, a production system including a robot, a controller that controls the robot, a person detection part that detects whether or not an operator has entered a cooperative operation space where the robot and the operator are supposed to enter at the same time in order to work in cooperation, a speed detection part that detects the speed of the robot, and an external-force detection part that detects an external force applied to the robot, is provided.

The controller includes:

a power cutoff unit that cuts off power supplied to the robot;

a reference-speed storage unit that stores a predetermined reference speed;

a reference-force storage unit that stores a predetermined reference force;

first speed comparison unit that compares the current speed of the robot and the predetermined reference speed stored in the reference-speed storage unit, the current speed being detected by the speed detection part, the first speed comparison unit having the function of activating the power cutoff unit so as to stop an operation of the robot when the current speed exceeds the predetermined reference speed; and an external-force comparison unit that compares a current external force applied to the robot and the predetermined reference force stored in the reference-force storage unit, the current external force being detected by the external-force detection part, the external-force comparison unit having the function of activating the power cutoff unit so as to stop the operation of the robot when the current force exceeds the predetermined reference force, the controller being configured to disable the functions of the first speed comparison unit and the external-force comparison unit while the person detection part detects the absence of the operator in the cooperative operation space.

BRIEF DESCRIPTION OF THE DRAWINGS

A detailed description regarding typical embodiments of the present invention shown in the accompanying drawings further clarifies the object, characteristics, and advantages of the present invention and other objects, characteristics, and advantages of the present invention.

DETAILED DESCRIPTION

Figure 1:
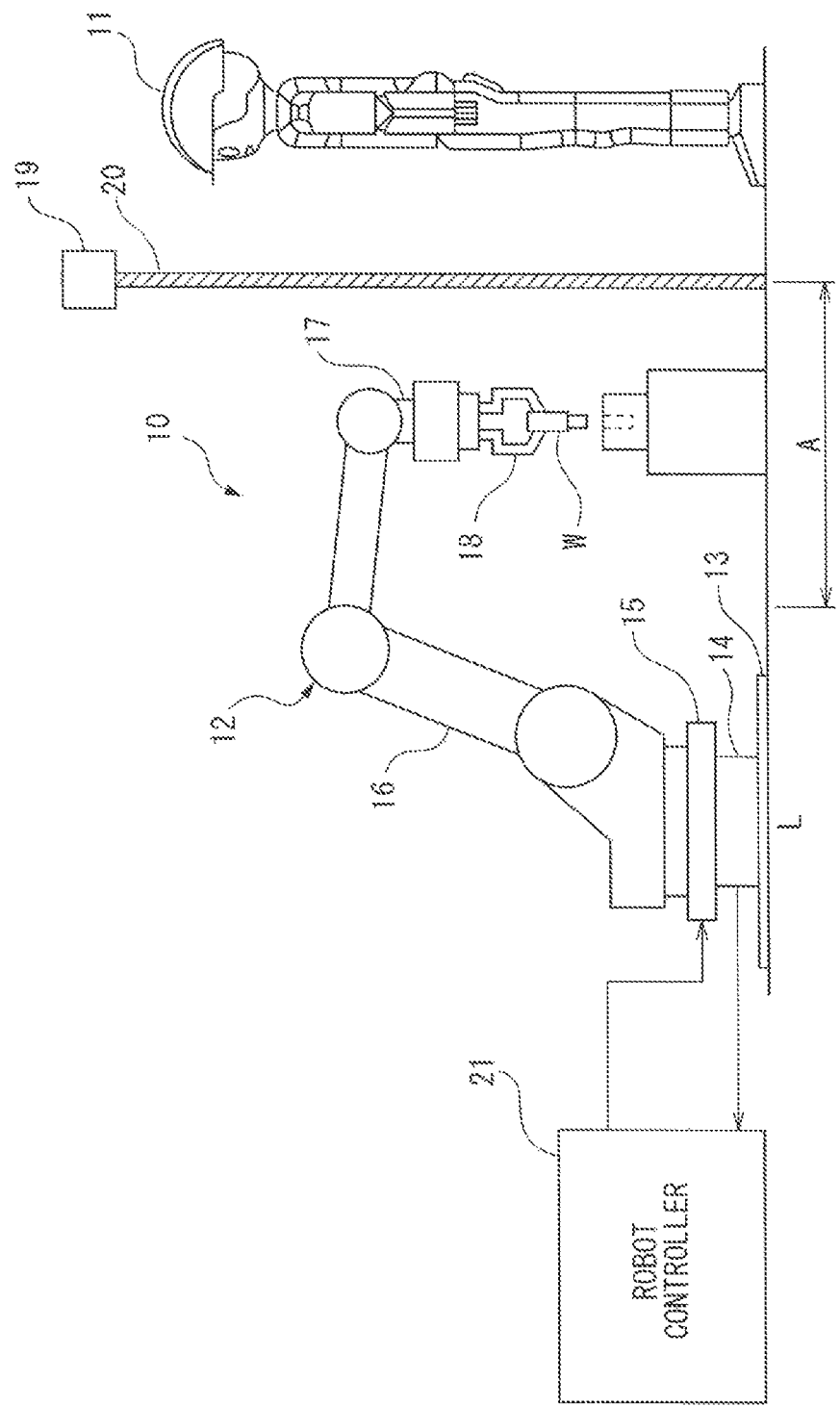
FIG. 1 is a side view showing a robot that is applicable to a production system of the present disclosure and a peripheral configuration of the robot.

Embodiments of the present disclosure will be described below with reference to the accompanying drawings. In the reference drawings, the same components or functional parts are indicated by the same reference symbols. For clear understanding, the scales of the drawings are optionally changed. The configurations in the drawings are merely exemplary and the present invention is not limited to the configurations that are shown in the drawings.

FIG. 1 is a side view showing a robot applicable to a production system of the present disclosure and a peripheral configuration of the robot.

In a production system 10 of FIG. 1, a person 11 approaches a robot 12. The person 11 and the robot 12 work in cooperation in the same space. The person 11 acts as an operator that performs an operation in cooperation with the robot 12. For example, the operator decides the final position of the workpiece that is attached by the robot 12 and fixes the workpiece.

The robot 12 is an industrial robot including a vertical articulated manipulator. A fixing plate 13 is fixed on a floor L in order to install the robot 12 on the floor L. A force sensor 14 is disposed on the fixing plate 13. Moreover, a robot base 15 of the robot 12 is disposed on the force sensor 14.

The force sensor 14 is used as an external-force detection device that detects an external force applied to the robot 12, more preferably an external force (a so-called "contact force") that is applied when the person 11 comes into contact with the robot 12. The force sensor 14 includes a strain detector that detects strain caused by an external force on the force sensor 14. The strain detector is formed by, for example, a strain gauge, in particular, a semiconductor strain gauge. More specifically, the force sensor 14 includes a force sensor body and a strain gauge that is attached to the force sensor body. In FIG. 1, the force sensor 14 is attached to the robot base 15. The force sensor 14 may be attached to other parts of the robot 12, for example, a joint between links that constitutes a robot arm 16. Moreover, the force sensor 14 may obtain acceleration in a collision of the robot 12 by means of an acceleration sensor and detect a computable force as a contact force based on the obtained acceleration.

A robot wrist flange 17 is mounted on the distal end of the robot arm 16. A gripping hand 18 or an operating tool (not shown) is provided on the distal end of the robot wrist flange 17. The gripping hand 18 can grip a workpiece W based on a command from a robot controller 21 and release the workpiece W after the robot 12 moves the workpiece W to a desired location.

As shown in FIG. 1, a person detection part 19 is installed near the robot 12. The person detection part 19 detects whether or not the person 11 has entered a cooperative operation space A where the person 11 and the robot 12 are supposed to enter at the same time in order to work in cooperation.

The person detection part 19 forms a two-dimensional detection space 20 at a boundary between the cooperative operation space A and an external space. Alternatively, the person detection part 19 may form a three-dimensional detection space (not shown) containing the cooperative operation space A. The two-dimensional or three-dimensional detection space can be formed using, for example, the detection range of a photoelectric sensor or the monitoring range of a security camera. The cooperative operation space A preferably includes at least a range that is determined by the physically movable range of components of the robot 12, for example, the rotatable range of a link constituting the robot arm 16.

Moreover, the robot 12 is connected to the robot controller 21. The force sensor 14 and the person detection part 19 are also connected to the robot controller 21.

The robot controller 21 is a digital computer that controls the operation of the robot 12. More specifically, the robot controller 21 operates the robot arm 16 by providing a predetermined operation command (e.g., a torque command, a speed command, or a position command) for a servo motor that drives each axis of the robot 12.

Embodiments of the production system 10 will be described below, which allow the person 11 and the robot 12 to work in cooperation in the cooperative operation space A.

Figure 2:
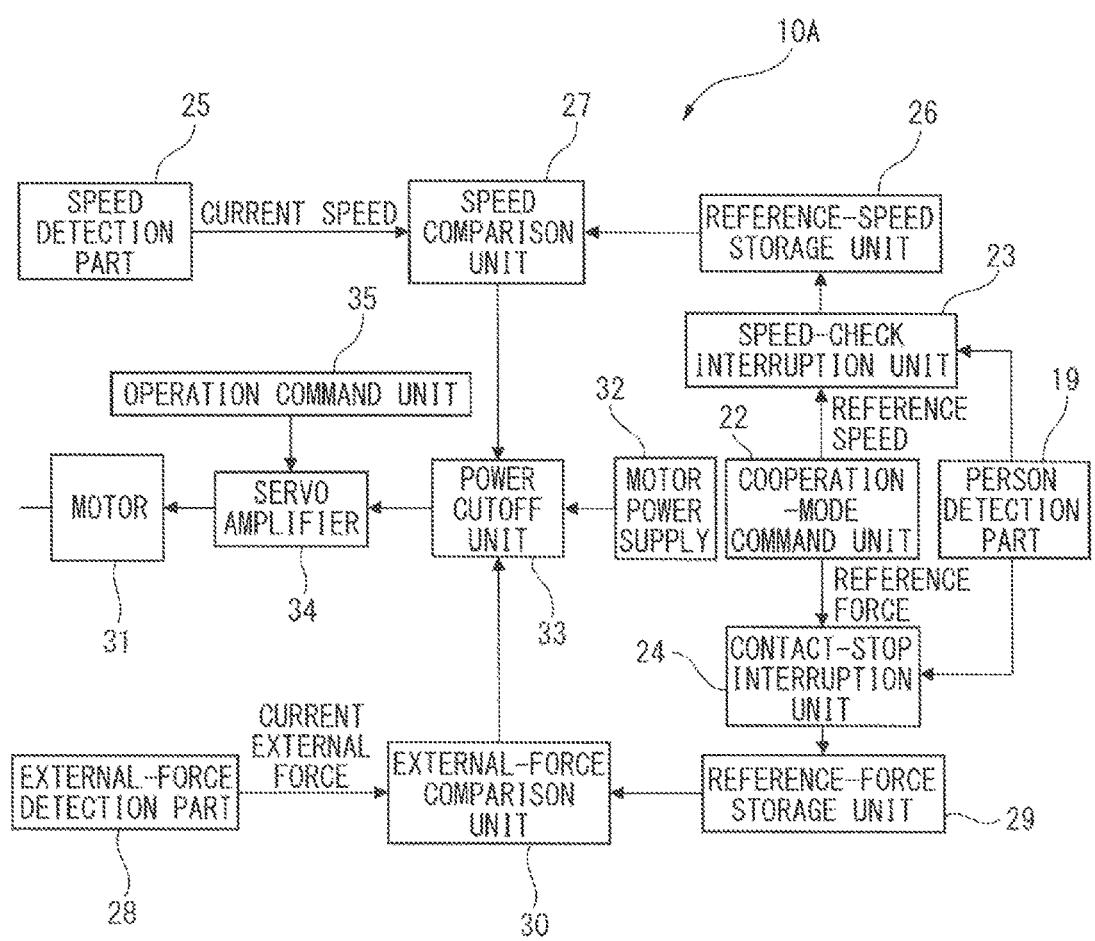
FIG. 2 is a function block diagram that shows a production system according to first embodiment.

FIG. 2 is a function block diagram that shows a production system 10A according to first embodiment.

As shown in FIG. 2, the production system 10A of the first embodiment includes a person detection part 19, a cooperation-mode command unit 22, a speed-check interruption unit 23, a contact-stop interruption unit 24, a speed detection part 25, a reference-speed storage unit 26, a speed comparison unit 27, an external-force detection part 28, a reference-force storage unit 29, an external-force comparison unit 30, a motor 31, a motor power supply 32, a power cutoff unit 33, a servo amplifier 34, an operation command unit 35 and the like. Referring to FIG. 2, the functions of the parts will be discussed below.

As described above, the person detection part 19 has the function of detecting whether or not the person 11 has entered the cooperative operation space A (FIG. 1).

The cooperation-mode command unit 22 provides the robot 12 with a command for starting cooperation mode, i.e., an operation mode of the robot 12 that works in cooperation with the person 11. This command includes at least parameters such as a reference speed that is used in the speed comparison unit 27 and a reference force used in the external-force comparison unit 30.

The reference speed is inputted to the reference-speed storage unit 26 through the speed-check interruption unit 23 and is stored therein. The reference force is inputted to the reference-force storage unit 29 through the contact-stop interruption unit 24 and is stored therein. The storage units 26 and 29 are, for example, memory device such as random access memory (RAM) or magnetic storage device such as a hard disk.

The speed comparison unit 27 has the function of comparing a predetermined reference speed that is stored in the reference-speed storage unit 26 and the current speed of the robot 12, and activating the power cutoff unit 33, which will be discussed later, when the current speed of the robot 12 exceeds the predetermined reference speed. The current speed of the robot 12 is obtained by the speed detection part 25 that detects the rotation speed of the motor 31 for driving the robot 12. The speed detection part 25 may be, for example, a pulse coder.

The external-force comparison unit 30 has the function of comparing a predetermined reference force stored in the reference-force storage unit 29 and a current external force applied to the robot 12, and activating the power cutoff unit 33, which will be discussed later, when the current external force of the robot 12 exceeds the predetermined reference force. The current external force of the robot 12 is obtained by the external-force detection part 28. The external-force detection part 28 is an external-force detection device such as the force sensor 14 that is attached to the robot base 15 or a joint of the robot arm 16 as shown in FIG. 1.

The motor 31 for driving the robot 12 is a servo motor. The operation command unit 35 outputs, to the servo amplifier 34, a command signal (operation command) for operating the robot 12 according to a robot operation program that is prepared in advance. The robot operation program is stored in the robot controller 21 shown in FIG. 1.

The servo amplifier 34 receives the command signal that is outputted from the operation command unit 35. The servo amplifier 34 has the function of controlling the motor 31 so that the command signal matches an output signal from a pulse coder (not shown) that detects the rotational position of the rotary axis of the motor 31. The pulse coder is also preferably used as the speed detection part 25.

The motor power supply 32 is a power supply that supplies electric power (power) for operating the motor 31, to the servo amplifier 34.

The power cutoff unit 33 has the function of cutting off power to the motor 31 so as to stop the robot 12.

The power cutoff unit 33 is activated so as to cut off power to the motor 31 at least one of the time when the current speed of the robot 12 exceeds the reference speed in a speed comparison by the speed comparison unit 27 and the time when the current external force of the robot 12 exceeds the reference force in an external force comparison by the external-force comparison unit 30.

The reference speed is preferably the maximum value of a robot operation speed where the person 11 is not injured when the robot 12 collides with the person 11. For example, standards on cooperation robots (ISO10218-1) specify the maximum speed of a robot in the cooperative operation space at 250 mm/s. Thus, the reference speed can be set at 250 mm/s. Obviously, the reference speed may be set lower than 250 mm/s.

The reference force is preferably the maximum value of a contact force that does not injure the person 11 when the robot 12 collides with the person 11. The reference speed and the reference force are also similarly defined in the following embodiments.

The speed-check interruption unit 23 has the function of interrupting the speed comparison in the speed comparison unit 27 while the person detection part 19 detects the absence of the person 11 in the cooperative operation space A. Specifically, the speed-check interruption unit 23 disables the function of the speed comparison unit 27 so as to deactivate the power cutoff unit 33 while the person 11 is absent in the cooperative operation space A. If the person detection part 19 detects the entry of the person 11 into the cooperative operation space A, the speed-check interruption unit 23 enables the function of the speed comparison unit 27.

Moreover, the contact-stop interruption unit 24 has the function of interrupting the external force comparison in the external-force comparison unit 30 while the person detection part 19 detects the absence of the person 11 in the cooperative operation space A. Specifically, the contact-stop interruption unit 24 disables the function of the external-force comparison unit 30 so as to deactivate the power cutoff unit 33 while the person 11 is absent in the cooperative operation space A. If the person detection part 19 detects the entry of the person 11 into the cooperative operation space A, the contact-stop interruption unit 24 enables the function of the external-force comparison unit 30.

Furthermore, the robot controller 21 in FIG. 1 includes the cooperation-mode command unit 22, the speed-check interruption unit 23, the contact-stop interruption unit 24, the reference-speed storage unit 26, the speed comparison unit 27, the reference-force storage unit 29, the external-force comparison unit 30, the motor 31, the motor power supply 32, the power cutoff unit 33, the servo amplifier 34, and the operation command unit 35. Moreover, the robot 12 in FIG. 1 includes the speed detection part 25, the external-force detection part 28, and the motor 31. This configuration is similar to that of the following embodiments.

The production system 10A of the first embodiment achieves the following action and effect.

In FIG. 2, the operation command unit 35 outputs the operation command to the servo amplifier 34 according to the robot operation program, allowing the servo amplifier 34 to control the motor 31. Thus, the robot arm 16 of the robot 12 and the gripping hand 18 operate according to the operation command.

When the person detection part 19 detects the entry of the person 11 into the cooperative operation space A while the robot 12 operates in the cooperative operation space A, the speed-check interruption unit 23 enables the function of the speed comparison unit 27 and the contact-stop interruption unit 24 enables the function of the external-force comparison unit 30. In this phase, when the speed detection part 25 detects that the speed of the robot 12 exceeds the predetermined reference speed, the power cutoff unit 33 is activated so as to cut off the electric power to the motor 31, thereby the operation of the robot 12 is stopped. Also when the external-force detection part 28 detects that an external force applied to the robot 12 exceeds the predetermined reference force, the power cutoff unit 33 is activated so as to cut off the electric power to the motor 31, thereby the operation of the robot 12 is stopped.

Specifically, in the presence of the person 11 in the cooperative operation space A, the operation of the robot 12 is stopped when the speed of the robot 12 exceeds the predetermined reference speed or an external force to the robot 12 exceeds the predetermined reference force because of the person 11 coming into contact with the robot 12. This can ensure the safety of the person 11 that works in cooperation with the robot 12 in the cooperative operation space A.

While the person detection part 19 detects the absence of the person 11 in the cooperative operation space A, the speed-check interruption unit 23 disables the function of the speed comparison unit 27 and the contact-stop interruption unit 24 disables the function of the external-force comparison unit 30. In this phase, even if the speed of the robot 12 that is detected by speed detection part 25 exceeds the predetermined reference speed or the external force to the robot 12 that is detected by the external-force detection part 28 exceeds the predetermined reference force, the power cutoff unit 33 is not activated and thus the operation of the robot 12 is not stopped.

Accordingly, the robot 12 can be operated at a higher speed than the predetermined reference speed in the absence of the person 11 in the cooperative operation space A. Furthermore, even if a force that is generated by the robot 12 exceeds the predetermined reference force when the robot 12 is operated at a high speed, the operation of the robot 12 is not stopped.

More specifically, when the robot 12 is operated at the high speed, a force that is generated by the robot 12, for example, a bending load, a torsional load and the like, may be detected as an external force to the robot 12 by the external-force detection part 28. In this case, if the external-force comparison unit 30 determines that a force generated by the robot 12 exceeds the predetermined reference force, the power cutoff unit 33 is activated so as to stop the robot 12 even in the absence of the person 11 in the cooperative operation space A. In the present embodiment, however, the function of the external-force comparison unit 30 is disabled in the absence of the person 11 in the cooperative operation space A. Thus, the foregoing problem does not occur. Since the robot 12 can be instructed so as to operate at a high speed in the absence of the person 11 in the cooperative operation space A, the operator and the robot can perform cooperative work with higher efficiency.

A production system 10B according to second embodiment will be described below. Differences from the first embodiment will be mainly discussed in the following explanation. The same constituent elements as those of the first embodiment are indicated by the same reference symbols and the explanation thereof is omitted.

Figure 3:
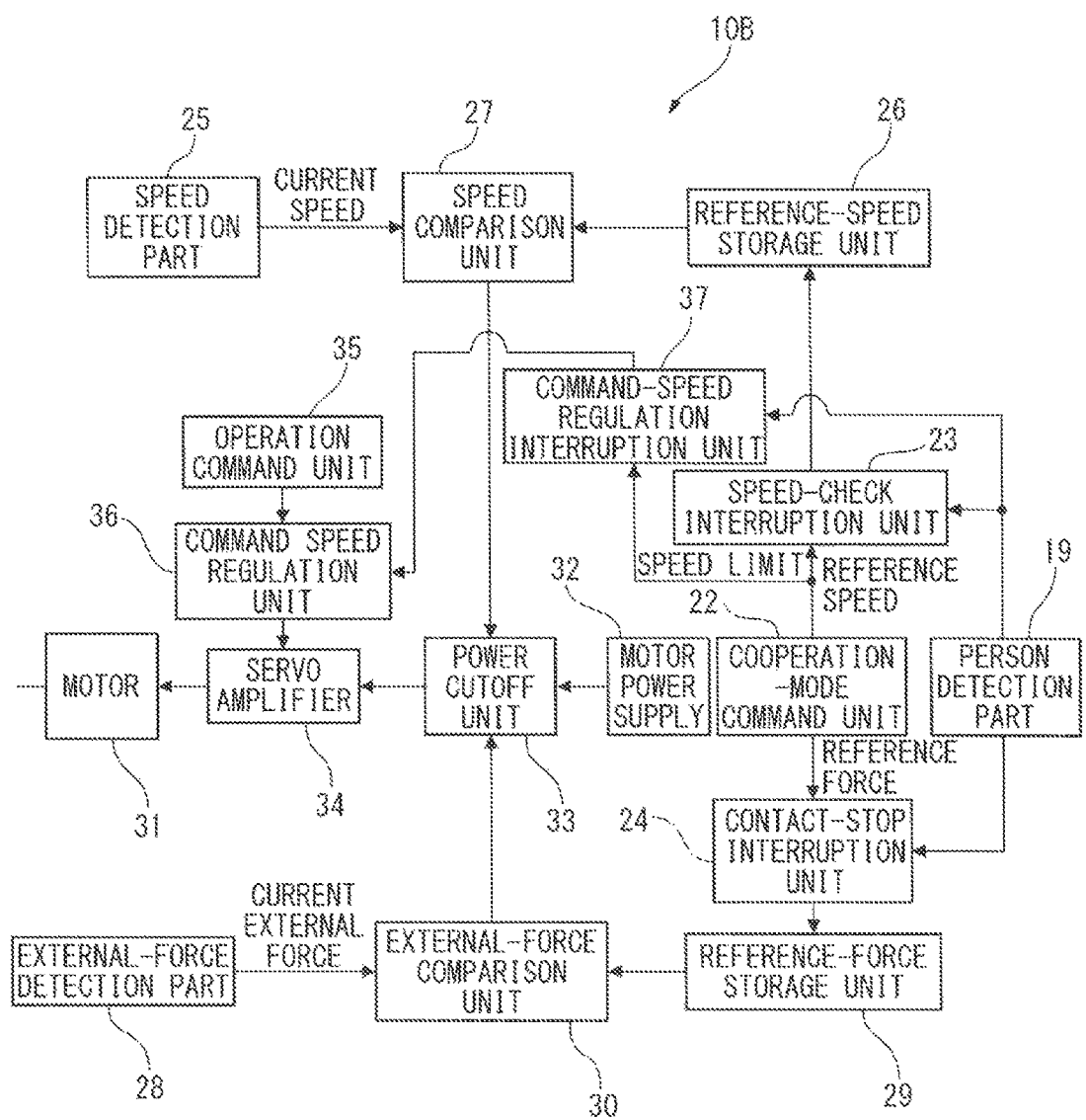
FIG. 3 is a function block diagram that shows a production system according to second embodiment.

FIG. 3 is a function block diagram that shows the production system 10B according to the second embodiment.

As shown in FIG. 3, the production system 10B of the second embodiment further includes a command speed regulation unit 36 and a command-speed regulation interruption unit 37 in addition to the configuration of the production system 10A (FIG. 2) of the first embodiment.

The command speed regulation unit 36 in FIG. 3 has the function of regulating all command speeds that is included in the operation command outputted from the operation command unit 35 to the servo amplifier 34, to a predetermined speed limit or lower. In this regulation, all of the command speeds that are included in the operation command from the operation command unit 35 are reduced at a constant rate. In other words, the command speed regulation unit 36 uniformly reduces all of the operation speeds that are instructed to the robot 12 so that the operation speeds are equal to or less than the predetermined speed limit.

The command-speed regulation interruption unit 37 in FIG. 3 has the function of interrupting command speed regulation in the command speed regulation unit 36 while the person detection part 19 detects the absence of the person 11 in the cooperative operation space A. In other words, the command-speed regulation interruption unit 37 disables the function of the command speed regulation unit 36 in the absence of the person 11 in the cooperative operation space A. When the person detection part 19 detects the entry of the person 11 into the cooperative operation space A, the command-speed regulation interruption unit 37 enables the function of the command speed regulation unit 36.

The speed limit is preferably the maximum value of a robot operation speed where the external-force comparison unit 30 keeps the power cutoff unit 33 inactive. As described in the first embodiment, if the external-force comparison unit 30 determines that a force generated by the robot 12 exceeds a predetermined reference force in a high-speed operation of the robot 12, the operation of the robot 12 is stopped. Thus, the speed of the robot 12 is selected as the speed limit so as not to cause such circumstances. The speed limit is also similarly defined in subsequent embodiments.

The value of the speed limit is included in a command from the cooperation-mode command unit 22. The value is inputted to the command speed regulation unit 36 from the cooperation-mode command unit 22 through the command-speed regulation interruption unit 37 at the start of a cooperation mode.

The command speed regulation unit 36 and the command-speed regulation interruption unit 37 are included in the robot controller 21 that is shown in FIG. 1.

In addition to the action and effect of the first embodiment, the production system 10B of the second embodiment achieves the following action and effect.

The operation command that is outputted from the operation command unit 35 includes the command speed of the robot 12 and is described in a robot operation program that is stored in the robot controller 21. If the robot operation program is described so that the robot 12 is operated at a low speed in the presence of the person 11 in the cooperative operation space A and the robot 12 is operated at a high speed in the absence of the person 11 in the cooperative operation space A, the program becomes complicated and thus a long time is required for confirmation of the program.

In order to avoid this problem, the robot controller 21 of the second embodiment includes the command speed regulation unit 36 that reduces, at a constant rate, all of the command speeds that are included in the operation command from the operation command unit 35 so as to regulate the command speeds to the predetermined speed limit or lower. Moreover, the function of the command speed regulation unit 36 is enabled in the presence of the person 11 in the cooperative operation space A and is disabled in the absence of the person 11 in the cooperative operation space A.

By adopting the above configuration, even if a program for only high-speed operation of the robot 12 is described, the robot controller 21 of the present embodiment can operate the robot 12 at a low speed when the person 11 enters the cooperative operation space A. Furthermore, the robot operation program can be simplified.

A production system 10C according to third embodiment will be described below. Differences from the first embodiment will be mainly discussed in the following explanation. The same constituent elements as those of the first embodiment are indicated by the same reference symbols and the explanation thereof is omitted.

Figure 4:
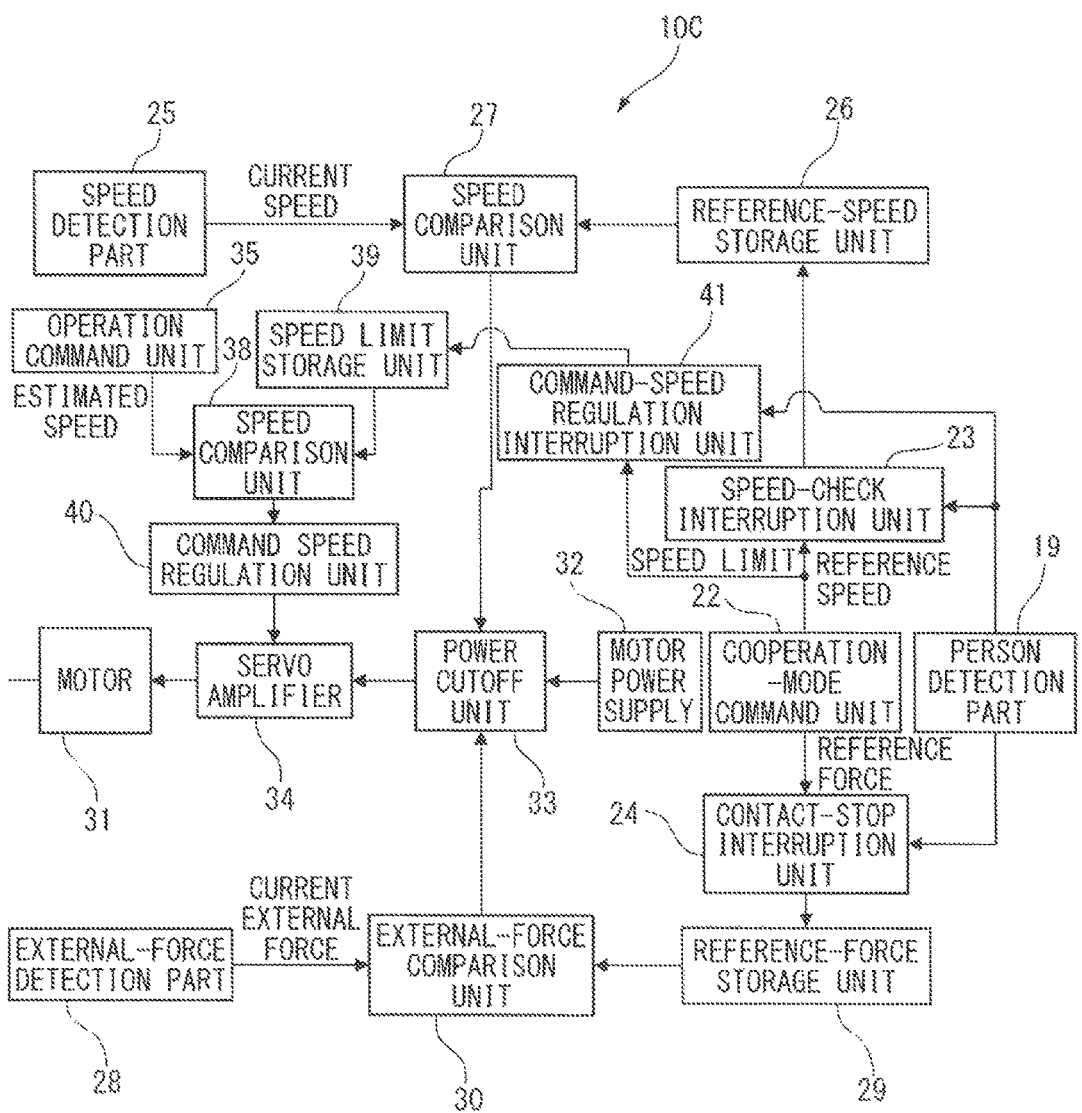
FIG. 4 is a function block diagram that shows a production system according to third embodiment.

FIG. 4 is a function block diagram that shows the production system 10C according to the third embodiment.

As shown in FIG. 4, the production system 10C of the third embodiment further includes second speed comparison unit 38, a speed limit storage unit 39, a command speed regulation unit 40, and a command-speed regulation interruption unit 41 in addition to the configuration in the production system 10A (FIG. 2) of the first embodiment.

The speed comparison unit 38 in FIG. 4 has the function of comparing the speed of the robot 12 that is estimated from the command speed in the operation command outputted from the operation command unit 35 (hereinafter, the speed is referred to as an estimated speed) and the predetermined speed limit that is stored in the speed limit storage unit 39. The speed comparison unit 38 has the function of determining whether or not the estimated speed of the robot 12 exceeds a predetermined speed limit. An estimated speed calculation unit (not shown) that determines the estimated speed is preferably provided between the operation command unit 35 and the speed comparison unit 38. Alternatively, the speed comparison unit 38 may have the function of determining the estimated speed.

The command speed regulation unit 40 has the function of regulating, to the speed limit or lower, only a command speed that is estimated to be higher than the predetermined speed limit by the speed comparison unit 38 among command speeds included in the operation command from the operation command unit 35. Moreover, the command speed regulation unit 40 transmits a command speed to the servo amplifier 34 without regulation if the command speed is estimated to be not higher than the predetermined speed limit among command speeds included in the operation command from the operation command unit 35.

The command-speed regulation interruption unit 41 has the function of interrupting command speed regulation in the command speed regulation unit 40 while the person detection part 19 detects the absence of the person 11 in the cooperative operation space A. In other words, the command-speed regulation interruption unit 41 disables the function of the command speed regulation unit 40 while the person 11 is absent in the cooperative operation space A. If the person detection part 19 detects the entry of the person 11 into the cooperative operation space A, the command-speed regulation interruption unit 41 enables the function of the command speed regulation unit 40.

The value of the speed limit that is stored in the speed limit storage unit 39 is included in the command from the cooperation-mode command unit 22 and is inputted to the speed limit storage unit 39 from the cooperation-mode command unit 22 through the command-speed regulation interruption unit 41 at the start of the cooperation mode.

The speed comparison unit 38, the speed limit storage unit 39, the command speed regulation unit 40, and the command-speed regulation interruption unit 41 are provided in the robot controller 21 that is shown in FIG. 1.

In addition to the action and effect of the first embodiment, the production system 10C of the third embodiment achieves the following action and effect.

In the production system 10B of the second embodiment, when the entry of the person 11 into the cooperative operation space A is detected, all of the command speeds included in the operation command from the operation command unit 35 are reduced at a constant rate. Thus, even if a program for only high-speed operation of the robot 12 is described as a robot operation program, the robot 12 can be operated at a low speed in the presence of the person 11 in the cooperative operation space A.

However, in an operation process that requires delicate movements, e.g., the operation for gripping the workpiece W and the like, the robot 12 needs to operate at a low speed even in the absence of the person 11 in the cooperative operation space A. In this case, when the program for operating the robot 12 at a low speed is performed by the robot controller 21 of the production system 10B according to the second embodiment, the command speed based on the program decreases at a constant rate at the time when the entry of the person 11 into the cooperative operation space A is detected. In other words, a low-speed operation is slowed down.

In order to avoid this problem, the robot controller 21 of the third embodiment includes the command speed regulation unit 40 that regulates, to the speed limit or lower, only a command speed estimated to be higher than the predetermined speed limit by the speed comparison unit 38 out of command speeds that is included in the operation command from the operation command unit 35. Moreover, the function of the command speed regulation unit 40 is enabled in the presence of the person 11 in the cooperative operation space A and is disabled in the absence of the person 11 in the cooperative operation space A.

As described above, in the presence of the person 11 in the cooperative operation space A, the speed of the robot 12 can be reduced to the predetermined speed limit or less only when the command for operating the robot 12 at a higher speed than the predetermined speed limit is outputted. In contrast, when the command for operating the robot 12 at a speed that is not higher than the predetermined speed limit is outputted, the command speed of the robot 12 is not regulated to a lower speed. Accordingly, an unnecessary slowdown of a low-speed operation, e.g., the operation for gripping the workpiece W can be avoided.

A production system 10D according to fourth embodiment will be described below. Differences from the second embodiment will be mainly discussed in the following explanation. The same constituent elements as those of the second embodiment are indicated by the same reference symbols and the explanation thereof is omitted.

Figure 5:
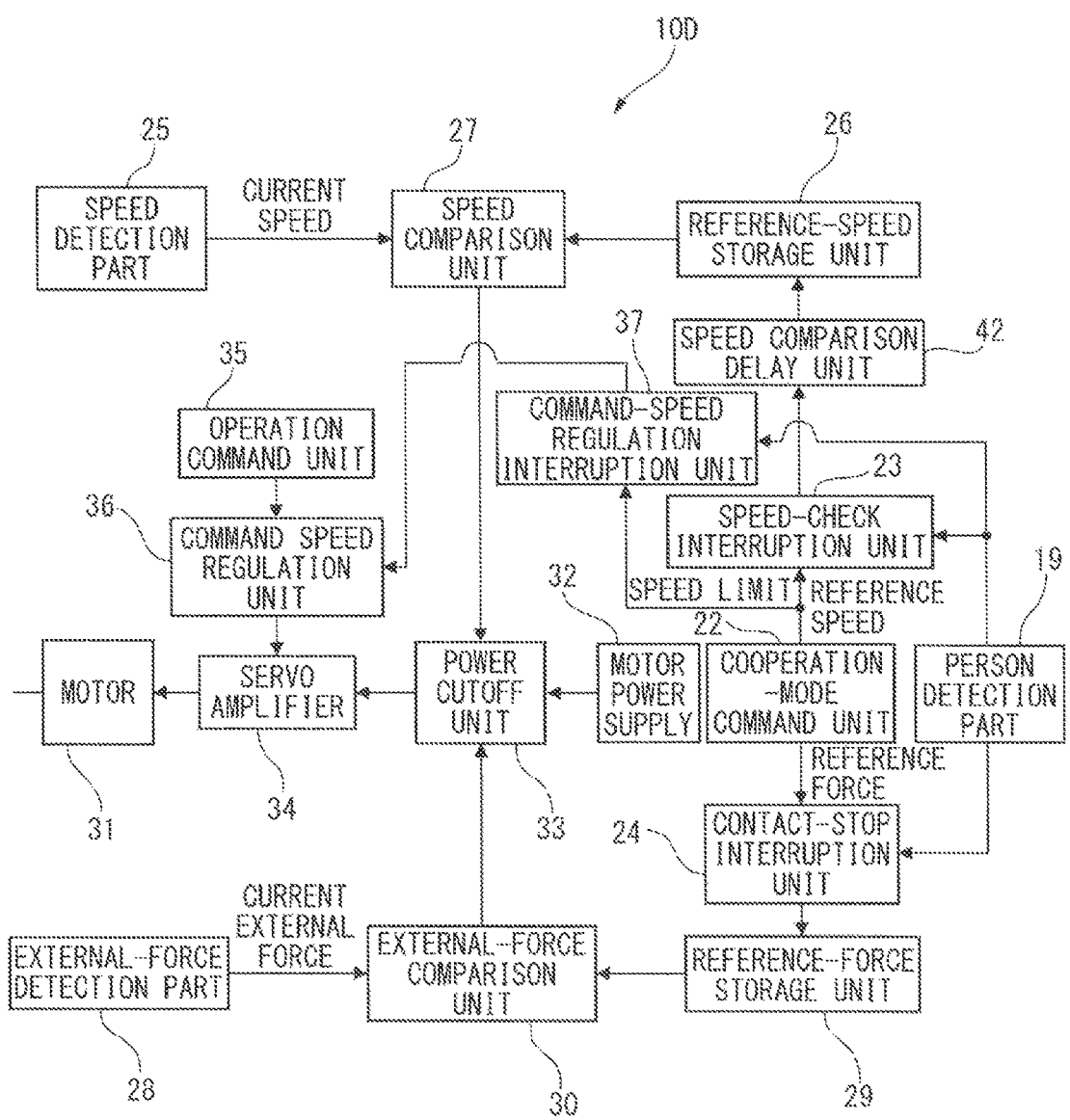
FIG. 5 is a function block diagram that shows a production system according to fourth embodiment.

FIG. 5 is a function block diagram that shows the production system 10D according to the fourth embodiment.

As shown in FIG. 5, the production system 10D of the fourth embodiment further includes a speed comparison delay unit 42 in addition to the configuration of the production system 10B (FIG. 3) of the second embodiment. The speed comparison delay unit 42 is provided in the robot controller 21 shown in FIG. 1.

In the production system 10B (FIG. 3) of the second embodiment, when the person detection part 19 detects the entry of the person 11 into the cooperative operation space A, the speed-check interruption unit 23 change the function of the speed comparison unit 27 from the disabled state to the enabled state.

In the fourth embodiment, the speed comparison delay unit 42 in FIG. 5 delays the time when the function of the speed comparison unit 27 is enabled from the time when the person detection part 19 detects the entry of the person 11 into the cooperative operation space A, by a predetermined short time (second).

In addition to the action and effect of the second embodiment, the production system 10D of the fourth embodiment achieves the following action and effect.

Even if the detection of the entry of the person 11 into the cooperative operation space A enables the command speed regulation unit 36 to reduce a command speed from the operation command unit 35 at a constant rate, the actual speed of the robot 12 does not rapidly decrease. The robot 12 slows down after a certain period of time, and thus if the speed of the robot 12 exceeds the predetermined reference speed in the certain period of time, a signal from the speed comparison unit 27 activates the power cutoff unit 33 so as to stop the operation of the robot 12.

In order to avoid this problem, in the robot controller 21 of the fourth embodiment, the speed comparison delay unit 42 is provided in the preceding stage of the speed comparison unit 27. By adopting this configuration, the function of the speed comparison unit 27 is enabled after a lapse of the certain period of time from the time when the entry of the person 11 in the cooperative operation space A is detected by the person detection part 19. Accordingly, the robot 12 can be prevented from unnecessarily stopping before the completion of slowdown.

Next, a production system 10E according to fifth embodiment will be described below. Differences from the third embodiment will be mainly discussed in the following explanation. The same constituent elements as those of the third embodiment are indicated by the same reference symbols and the explanation thereof is omitted.

Figure 6:
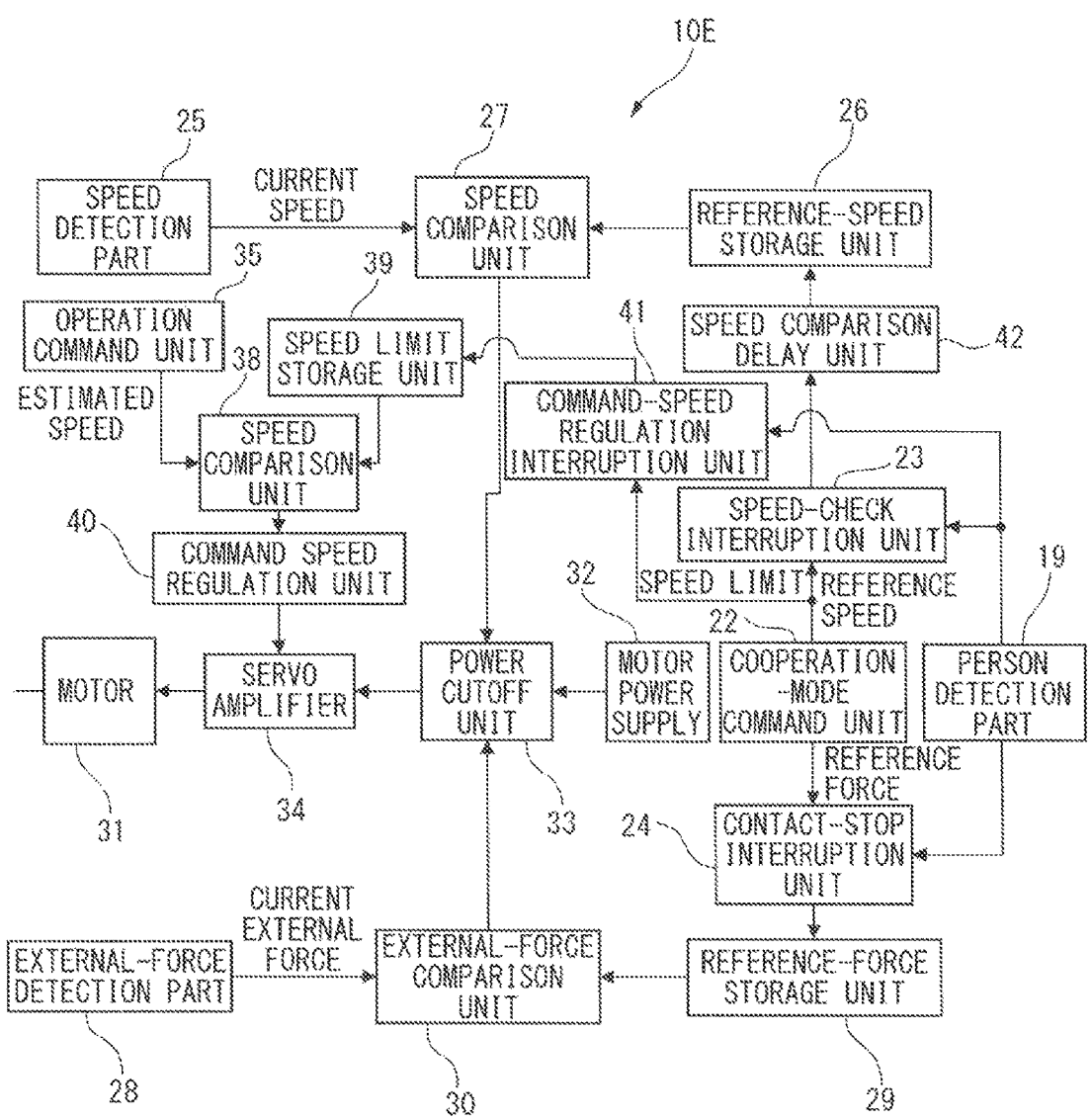
FIG. 6 is a function block diagram that shows a production system according to fifth embodiment.

FIG. 6 is a function block diagram that shows the production system 10E according to the fifth embodiment.

As shown in FIG. 6, the production system 10E of the fifth embodiment further includes a speed comparison delay unit 42 in addition to the configuration of the production system 10C (FIG. 4) of the third embodiment. This speed comparison delay unit 42 is provided in the robot controller 21 that is shown in FIG. 1.

Also in the production system 10C (FIG. 4) of the third embodiment, when the person detection part 19 detects the entry of the person 11 into the cooperative operation space A, the speed-check interruption unit 23 change the function of the speed comparison unit 27 from the disabled state to the enabled state.

In the fifth embodiment, the speed comparison delay unit 42 in FIG. 6 delays the time when the function of the speed comparison unit 27 is enabled from the time when the person detection part 19 detects the entry of the person 11 into the cooperative operation space A, by a predetermined short time (second).

In addition to the action and effect of the third embodiment, the production system 10E of the fifth embodiment achieves the same action and effect as the fourth embodiment.

Even if the detection of the entry of the person 11 into the cooperative operation space A enables the command speed regulation unit 40 to reduce the command speed of the robot 12 to the predetermined speed limit or less at the time when the command for operating the robot at a higher speed than the predetermined speed limit is outputted, the actual speed of the robot 12 does not rapidly decrease. The robot 12 slows down after a certain period of time and thus if the speed of the robot 12 exceeds the predetermined reference speed in the certain period of time, a signal from the speed comparison unit 27 activates the power cutoff unit 33 so as to stop the operation of the robot 12.

In order to avoid this problem, in the robot controller 21 of the fifth embodiment, the speed comparison delay unit 42 is provided in the preceding stage of the speed comparison unit 27 in the same way as the fourth embodiment. Thus, the function of the speed comparison unit 27 is enabled after the lapse of the certain period of time from the time when the person 11 is detected in the cooperative operation space A by the person detection part 19. Accordingly, the robot 12 can be prevented from unnecessarily stopping before the completion of slowdown.

Next, a production system 10F according to sixth embodiment will be described below. Differences from the second embodiment will be mainly discussed in the following explanation. The same constituent elements as those of the second embodiment are indicated by the same reference symbols and the explanation thereof is omitted.

Figure 7:
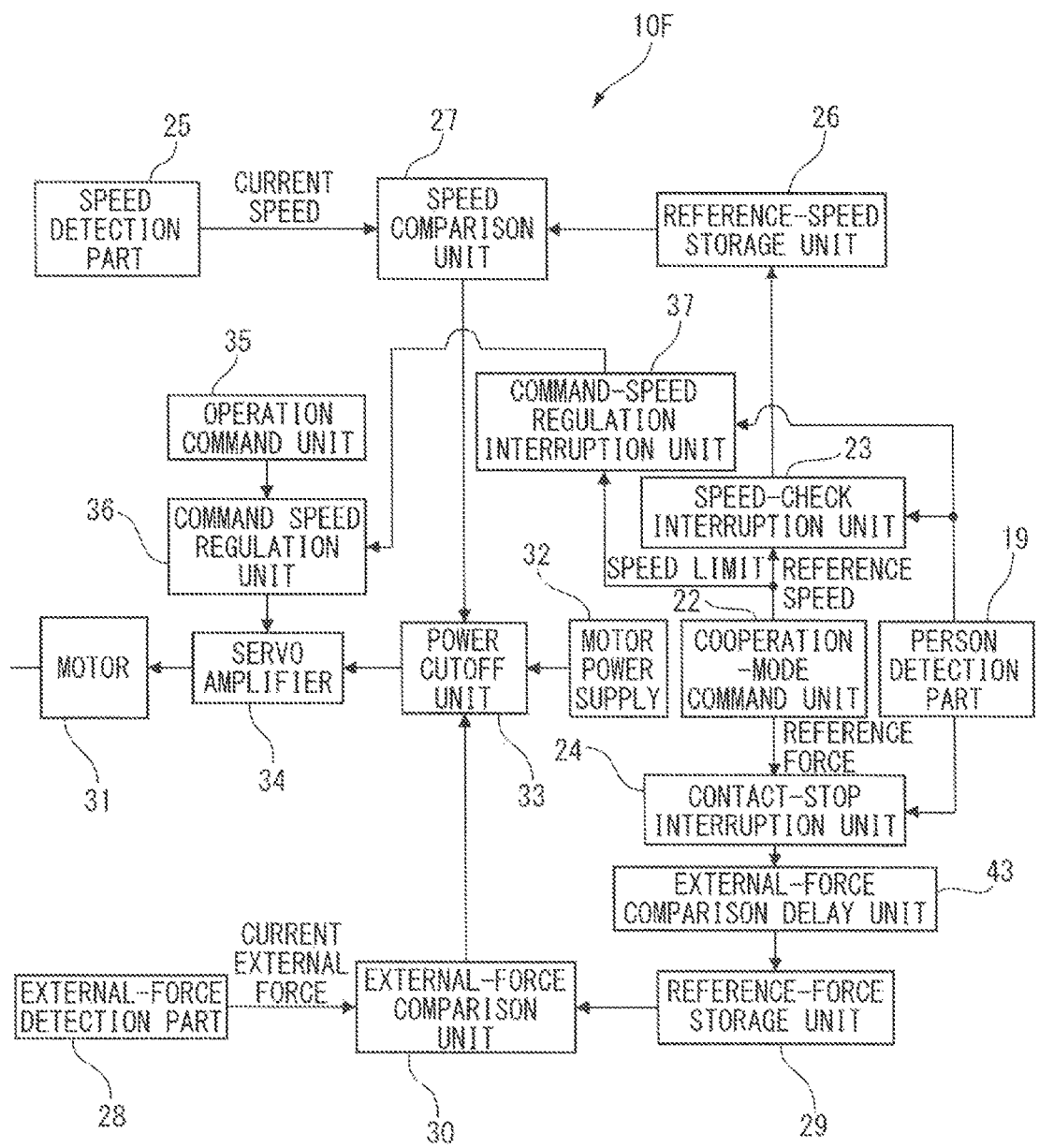
FIG. 7 is a function block diagram that shows a production system according to sixth embodiment.

FIG. 7 is a function block diagram that shows the production system 10F according to the sixth embodiment.

As shown in FIG. 7, the production system 10F of the sixth embodiment further includes an external-force comparison delay unit 43 in addition to the configuration of the production system 10B (FIG. 3) of the second embodiment. The external-force comparison delay unit 43 is provided in the robot controller 21 shown in FIG. 1.

In the production system 10B (FIG. 3) of the second embodiment, when the person detection part 19 detects the entry of the person 11 into the cooperative operation space A, the contact-stop interruption unit 24 changes the function of the external-force comparison unit 30 from the disabled state to the enabled state.

In the sixth embodiment, the external-force comparison delay unit 43 in FIG. 7 delays the time when the function of the external-force comparison unit 30 is enabled from the time when the person detection part 19 detects the entry of the person 11 into the cooperative operation space A, by a predetermined short time (second). The production system 10F of the sixth embodiment may additionally include the speed comparison delay unit 42 that is described above.

In addition to the action and effect of the second embodiment, the production system 10F of the sixth embodiment achieves the following action and effect.

Even if the detection of the entry of the person 11 into the cooperative operation space A enables the command speed regulation unit 36 to reduce a command speed from the operation command unit 35 at a constant rate, the actual speed of the robot 12 does not rapidly decrease. The robot 12 slows down after a certain period of time. The external-force detection part 28 detects the force that is generated by the robot 12 in the certain period of time. If this force exceeds a predetermined reference force, a signal from the external-force comparison unit 30 activates the power cutoff unit 33 so as to stop the operation of the robot 12.

In order to avoid this problem, in the robot controller 21 of the sixth embodiment, the external-force comparison delay unit 43 is provided in the preceding stage of the external-force comparison unit 30. Thus, the function of the external-force comparison unit 30 is enabled after a lapse of the certain period of time from the time when the person 11 is detected in the cooperative operation space A by the person detection part 19. Accordingly, the robot 12 can be prevented from unnecessarily stopping before the completion of slowdown.

Next, a production system 10G according to seventh embodiment will be described below. Differences from the third embodiment will be mainly discussed in the following explanation. The same constituent elements as those of the third embodiment are indicated by the same reference symbols and the explanation thereof is omitted.

Figure 8:
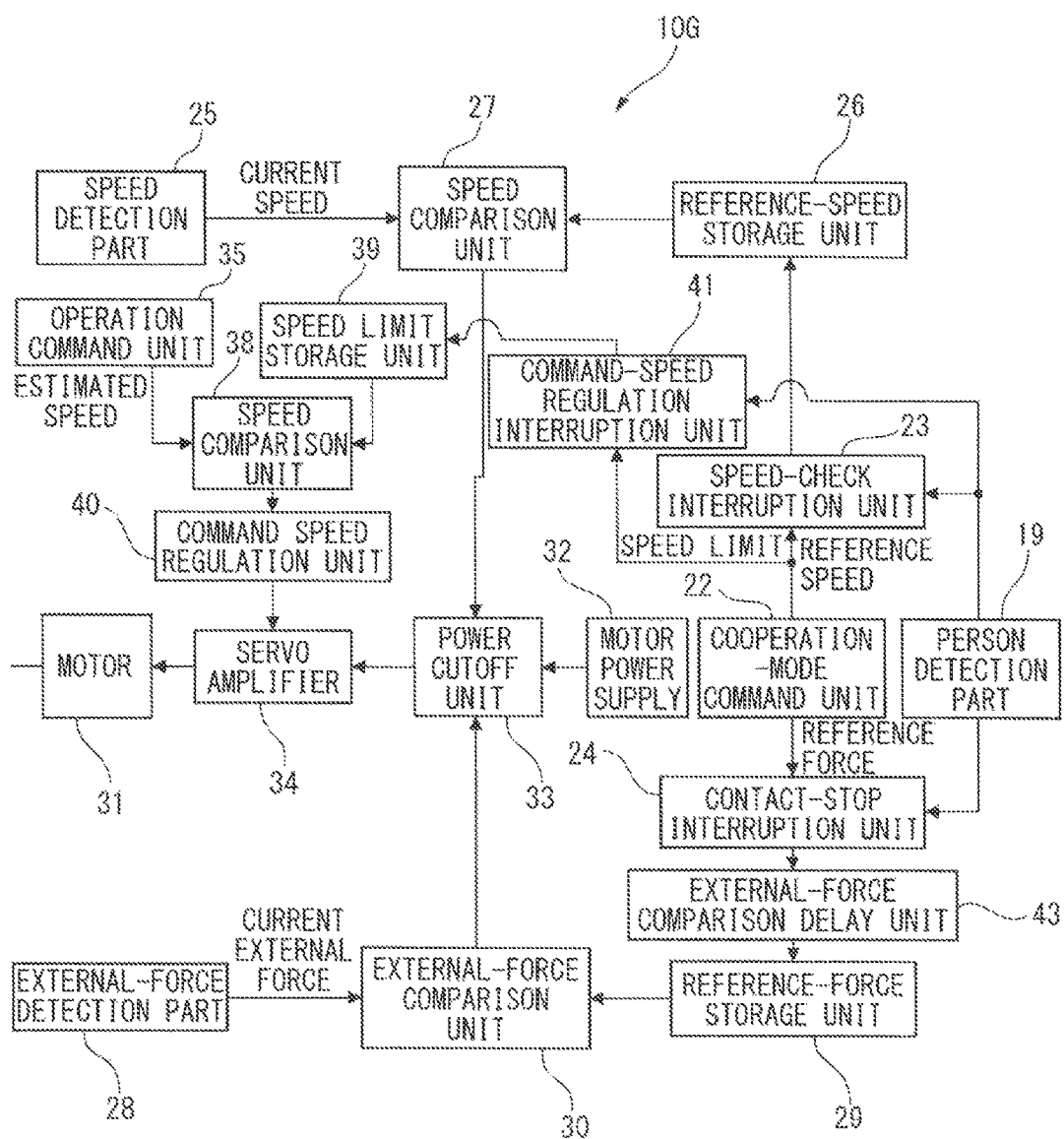
FIG. 8 is a function block diagram that shows a production system according to seventh embodiment.

FIG. 8 is a function block diagram that shows the production system 10G according to the seventh embodiment.

As shown in FIG. 8, the production system 10G of the seventh embodiment further includes an external-force comparison delay unit 43 in addition to the configuration of the production system 10C (FIG. 4) of the third embodiment that is described above. The external-force comparison delay unit 43 is provided in the robot controller 21 shown in FIG. 1.

In the production system 10C (FIG. 4) of the third embodiment, when the person detection part 19 detects the entry of the person 11 into the cooperative operation space A, the contact-stop interruption unit 24 changes the function of the external-force comparison unit 30 from the disabled state to the enabled state.

In the seventh embodiment, the external-force comparison delay unit 43 in FIG. 8 delays the time when the function of the external-force comparison unit 30 is enabled from the time when the person detection part 19 detects the entry of the person 11 into the cooperative operation space A, by a predetermined short time (second). The production system 10G of the seventh embodiment may additionally include the speed comparison delay unit 42 that is described above.

In addition to the action and effect of the third embodiment, the production system 10G of the seventh embodiment achieves the same action and effect as the sixth embodiment.

Even if the detection of the entry of the person 11 into the cooperative operation space A enables the command speed regulation unit 40 to reduce the command speed of the robot 12 to a predetermined speed limit or less when a command for operating the robot at a higher speed than the predetermined speed limit is outputted, the actual speed of the robot 12 does not rapidly decrease. The robot 12 slows down after a certain period of time. If a force generated by the robot 12 is detected by the external-force detection part 28 in the certain period of time and exceeds the predetermined reference force, the signal from the external-force comparison unit 30 activates the power cutoff unit 33 so as to stop the operation of the robot 12.

In order to avoid this problem, in the robot controller 21 of the seventh embodiment, the external-force comparison delay unit 43 is provided in the preceding stage of the external-force comparison unit 30 in the same way as the sixth embodiment that is described above. By adopting this configuration, the function of the external-force comparison unit 30 is enabled after a lapse of a certain period of time from the time when the person 11 is detected in the cooperative operation space A by the person detection part 19. Accordingly, the robot 12 can be prevented from unnecessarily stopping before the completion of slowdown.

The robot controller 21 in the embodiments can be formed by a computer system including a storage unit, a central processing unit (CPU), and a communication unit that are connected to one another via a bus. The storage unit is, for example, a read-only memory (ROM) or a random access memory (RAM). Programs stored in the ROM can be executed by the CPU so as to obtain the functions and operations of the speed-check interruption unit 23, the contact-stop interruption unit 24, the first speed comparison unit 27, the first command speed regulation unit 36, the first command-speed regulation interruption unit 37, the second speed comparison unit 38, the second command speed regulation unit 40, the second command-speed regulation interruption unit 41, the external-force comparison unit 30, and the like that are included in the robot controller 21.

The present invention is described according to the typical embodiments. A person skilled in the art could understand that the embodiments can be changed and various other changes, omissions, and additions may be made without departing from the scope of the present disclosure.

The aspects and effects of the present disclosure

A production system of the first aspect includes a robot, a controller that controls the robot, a person detection part that detects whether or not an operator has entered to a cooperative operation space where the robot and the operator are supposed to enter at the same time in order to work in cooperation, a speed detection part that detects the speed of the robot, and an external-force detection part that detects an external force applied to the robot, the controller including:

a power cutoff unit that cuts off power supplied to the robot;

a reference-speed storage unit that stores a predetermined reference speed;

a reference-force storage unit that stores a predetermined reference force;

first speed comparison unit that compares the current speed of the robot and the predetermined reference speed stored in the reference-speed storage unit, the current speed being detected by the speed detection part, the first speed comparison unit having the function of activating the power cutoff unit so as to stop an operation of the robot when the current speed exceeds the predetermined reference speed; and an external-force comparison unit that compares the current external force applied to the robot and the predetermined reference force stored in the reference-force storage unit, the current external force being detected by the external-force detection part, the external-force comparison unit having the function of activating the power cutoff unit so as to stop the operation of the robot when the current force exceeds the predetermined reference force, the controller being configured to disable the functions of the first speed comparison unit and the external-force comparison unit while the person detection part detects the absence of the operator in the cooperative operation space.

With respect to the second aspect, in the production system of the first aspect, the controller further includes:

an operation command unit that provides the robot with an operation command; and a command speed regulation unit that has the function of reducing, at a constant rate, all of the command speeds included in the operation command so as to regulate the command speeds to a predetermined speed limit or lower, wherein the predetermined speed limit is a maximum value of a robot operation speed where the external-force comparison unit does not activate the power cutoff unit, and the controller is configured to disable the function of the command speed regulation unit while the person detection part detects the absence of the operator in the cooperative operation space.

With respect to the third aspect, in the production system of the first aspect, the controller further includes:

an operation command unit that provides the robot with an operation command;

a speed limit storage unit that stores a predetermined speed limit;

second speed comparison unit that has the function of determining whether or not the estimated speed of the robot is higher than the predetermined speed limit by comparing the estimated speed and the predetermined speed limit stored in the speed limit storage unit, the estimated speed being estimated from a command speed included in the operation command; and a command speed regulation unit that has the function of regulating, to the predetermined speed limit or lower, only a command speed that is estimated to be higher than the predetermined speed limit by the second speed comparison unit among command speeds included in the operation command, the predetermined speed limit is a maximum value of a robot operation speed where the external-force comparison unit does not activate the power cutoff unit, and the controller is configured to disable the function of the command speed regulation unit while the person detection part detects the absence of the operator in the cooperative operation space.

With respect to the fourth aspect, in the production system of the second aspect or the third aspect, the controller further includes:

a speed comparison delay unit that has the function of delaying the time when the function of the first speed comparison unit is enabled from the time when the person detection part detects the entry of the operator into the cooperative operation space, by a predetermined time.

With respect to the fifth aspect, in the production system of any one of the second aspect to the fourth aspects, the controller further includes:

an external-force comparison delay unit that has the function of delaying the time when the function of the external-force comparison unit is enabled from the time when the person detection part detects the entry of the operator into the cooperative operation space, by a predetermined time.

According to the first aspect, in a production site where a robot and an operator work in cooperation in the same space, the efficiency of cooperative work by the operator and the robot can be improved while ensuring the safety of the operator.

According to the second aspect, even if only a program for a high-speed operation of the robot is described as a robot operation program, the robot can be operated at a low speed in the presence of the person in the cooperative operation space. Moreover, the robot operation program is simplified.

According to the third aspect, only a command speed where the speed of the robot exceeds the predetermined speed limit is regulated to the predetermined speed limit or lower. By adopting this configuration, the unnecessary slowdown of a low-speed operation, e.g., the operation for gripping a workpiece and the like can be prevented.

According to the fourth aspect, the function of the first speed comparison unit is enabled after a lapse of a certain period of time from the time when the person is detected in the cooperative operation space by the person detection part. By adopting this configuration, the first speed comparison unit can be prevented from unnecessarily operating to stop the robot before the speed of the robot decreases to the predetermined speed limit or less.

According to the fifth aspect, the function of the external-force comparison unit is enabled after a lapse of a certain period of time from the time when the person is detected in the cooperative operation space by the person detection part. By adopting this configuration, the external-force comparison unit can be prevented from unnecessarily operating to stop the robot before the speed of the robot decreases to the predetermined speed limit or less.

The invention claimed is:

1. A production system comprising:
   a robot,
   a controller that controls the robot;
   a person detection part that detects whether or not an operator has entered to a cooperative operation space where the robot and the operator are supposed to enter at the same time in order to work in cooperation,
   a speed detection part that detects a speed of the robot, and
   an external-force detection part that detects an external force applied to the robot, wherein
   the controller includes:
      a power cutoff unit that cuts off power supplied to the robot;
      a reference-speed storage unit that stores a predetermined reference speed;
      a reference-force storage unit that stores a predetermined reference force;
      first speed comparison unit that compares a current speed of the robot and the predetermined reference speed stored in the reference-speed storage unit, the current speed being detected by the speed detection part, the first speed comparison unit having a function of activating the power cutoff unit so as to stop an operation of the robot when the current speed exceeds the predetermined reference speed; and
      an external-force comparison unit that compares a current external force applied to the robot and the predetermined reference force stored in the reference-force storage unit, the current external force being detected by the external-force detection part, the external-force comparison unit having a function of activating the power cutoff unit so as to stop an operation of the robot when the current force exceeds the predetermined reference force, and
   the controller is configured to disable functions of the first speed comparison unit and the external-force comparison unit while the person detection part detects absence of the operator in the cooperative operation space.

2. The production system according to claim 1, wherein the controller further includes:
   an operation command unit that provides the robot with an operation command; and
   a command speed regulation unit that has a function of reducing, at a constant rate, all of the command speeds included in the operation command so as to regulate the command speeds to a predetermined speed limit or lower,
   the predetermined speed limit is a maximum value of a robot operation speed where the external-force comparison unit does not activate the power cutoff unit, and
   the controller is configured to disable the function of the command speed regulation unit while the person detection part detects absence of the operator in the cooperative operation space.

3. The production system according to claim 1, wherein the controller further includes:
   an operation command unit that provides the robot with an operation command;
   a speed limit storage unit that stores a predetermined speed limit;
   second speed comparison unit that has a function of determining whether or not an estimated speed of the robot is higher than the predetermined speed limit by comparing the estimated speed and the predetermined speed limit stored in the speed limit storage unit, the estimated speed being estimated from a command speed included in the operation command; and
   a command speed regulation unit that has a function of regulating, to the predetermined speed limit or lower, only a command speed that is estimated to be higher than the predetermined speed limit by the second speed comparison unit among command speeds included in the operation command,
   the predetermined speed limit is a maximum value of a robot operation speed where the external-force comparison unit does not activate the power cutoff unit, and
   the controller is configured to disable the function of the command speed regulation unit while the person detection part detects absence of the operator in the cooperative operation space.

4. The production system according to claim 2, wherein the controller further includes:
   a speed comparison delay unit that has a function of delaying the time when the function of the first speed comparison unit is enabled by a predetermined time from the time when the person detection part detects entry of the operator into the cooperative operation space.

5. The production system according to claim 2, wherein the controller further includes:
   an external-force comparison delay unit that has a function of delaying the time when the function of the external-force comparison unit is enabled by a predetermined time from the time when the person detection part detects entry of the operator into the cooperative operation space.

* * * * *